United States Patent
Wang et al.

(10) Patent No.: US 7,638,573 B2
(45) Date of Patent: Dec. 29, 2009

(54) BUTYL NANOCOMPOSITE VIA LOW MW ELASTOMER PRE-BLEND

(75) Inventors: Hsien-Chang Wang, Bellaire, TX (US); Ramanan Krishnamoorti, Bellaire, TX (US); Mun F. Tse, Seabrook, TX (US); Anthony J. Dias, Houston, TX (US); David Y. Chung, Bellaire, TX (US); Alan A. Galuska, Glen Gardener, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 661 days.

(21) Appl. No.: 11/400,662

(22) Filed: Apr. 7, 2006

(65) Prior Publication Data

US 2007/0238822 A1    Oct. 11, 2007

(51) Int. Cl.
*C08K 9/00* (2006.01)
*C08K 9/04* (2006.01)

(52) U.S. Cl. .................. 524/445; 524/447; 524/449; 524/451; 524/492; 524/495; 524/497

(58) Field of Classification Search .............. 524/445, 524/447, 449, 451, 492, 495, 497
See application file for complete search history.

(56) References Cited

U.S. PATENT DOCUMENTS

| | | | |
|---|---|---|---|
| 4,260,840 A | 4/1981 | Puls et al. | |
| 4,306,105 A | 12/1981 | Abernathy et al. | |
| 4,423,264 A | 12/1983 | Juguin et al. | |
| 4,718,986 A | 1/1988 | Comiotto et al. | |
| 4,814,542 A | 3/1989 | Forlani et al. | |
| 5,087,780 A | 2/1992 | Arganbright | |
| 5,576,372 A | 11/1996 | Kresge et al. | |
| 5,576,373 A | 11/1996 | Kresge et al. | |
| 5,665,183 A | 9/1997 | Kresge et al. | |
| 5,807,629 A | 9/1998 | Elspass et al. | |
| 5,883,173 A | 3/1999 | Elspass et al. | |
| 5,936,023 A | 8/1999 | Kato et al. | |
| 5,955,640 A | 9/1999 | Paludetto et al. | |
| 5,973,053 A | 10/1999 | Usuki et al. | |
| 5,998,685 A | 12/1999 | Nierlich et al. | |
| 6,034,164 A | 3/2000 | Elspass et al. | |
| 6,060,549 A | 5/2000 | Li et al. | |
| 6,103,817 A | 8/2000 | Usuki et al. | |
| 6,121,361 A | 9/2000 | Usuki et al. | |
| 7,371,793 B2 * | 5/2008 | Gong et al. ................. 524/445 |
| 2004/0132894 A1 * | 7/2004 | Dias et al. .................. 524/515 |

FOREIGN PATENT DOCUMENTS

| | | |
|---|---|---|
| EP | 0 747 322 | 12/1996 |
| JP | P2000-160024 | 6/2000 |
| JP | 2005 247969 | 9/2005 |
| WO | WO 94/22680 | 10/1994 |
| WO | WO 01/85831 | 11/2001 |
| WO | WO 02/100935 | 12/2002 |
| WO | WO 02/100936 | 12/2002 |
| WO | WO 2004/005388 | 1/2004 |
| WO | WO 2004/058874 | 7/2004 |

OTHER PUBLICATIONS

Journal of Applied Polymer Science (1997), 66(9), pp. 1781-1785.
Macromolecules (1997), 30(20), pp. 6333-6338.
U.S. Appl. No. 11/183,361, filed Jul. 18, 2005, Weng et al.
U.S. Appl. No. 11/184,000, filed Jul. 18, 2005, Weng et al.

* cited by examiner

*Primary Examiner*—Kriellion A Sanders
(74) *Attorney, Agent, or Firm*—Xiaobing Feng; Nancy T. Krawczyk

(57) ABSTRACT

The present invention provides a method to form a nanocomposite including blending a high molecular weight elastomer, a low molecular weight elastomer, and a clay to form a nanocomposite; wherein the high molecular weight elastomer has a weight average molecular weight greater than 250000; wherein the low molecular weight elastomer has a weight average molecular weight less than 150000. In another embodiment, the invention provides a method to form a nanocomposite including the steps of blending a low molecular weight elastomer and a clay to form a first mixture; blending a high molecular weight elastomer and the first mixture to form the nanocomposite; wherein the low molecular weight elastomer has a weight average molecular weight less than 150000; and, wherein the high molecular weight elastomer has a weight average molecular weight greater than 250000.

83 Claims, 4 Drawing Sheets

BUTYL NANOCOMPOSITE VIA LOW MW ELASTOMER PRE-BLEND

FIELD OF THE INVENTION

This invention relates to low-permeability nanocomposites useful for air barriers, processes to produce the same, and their use in articles of manufacture. In particular, this invention relates to butyl rubber nanocomposites from blends of high and low molecular weight elastomers.

BACKGROUND OF THE INVENTION

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. Common types of inorganic particles used in nanocomposites are phyllosilicates, an inorganic substance from the general class of so called "nano-clays" or "clays." Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire for a nanocomposite with low air permeability; especially a dynamically vulcanized elastomer nanocomposite such as used in the manufacture of tires.

The preparation of nanocomposites uses a number of methods to generate exfoliated clays. One of the most common methods relies upon the use of organically modified montmorillonite clays. Organoclays are typically produced through solution based ion-exchange reactions that replace sodium ions that exist on the surface of sodium montmorillonite with organic molecules such as alkyl or aryl ammonium compounds and typically known in the industry as swelling or exfoliating agents. See, e.g., U.S. Pat. No. 5,807,629, WO 02/100935, and WO 02/100936. Other background references include U.S. Pat. No. 5,576,373, U.S. Pat. No. 5,665,183, U.S. Pat. No. 5,807,629, U.S. Pat. No. 5,936,023, U.S. Pat. No. 6,121,361, WO 94/22680, WO 01/85831, and WO 04/058874.

One method to improve the organoclay performance is to use functionalized polymers to treat the clay. This approach uses materials that are soluble in water or materials that can be incorporated into the polymerization reaction. This approach has been used to prepare nylon nanocomposites, using for example, oligomeric and monomeric caprolactam as the modifier. Polyolefin nanocomposites, such as polypropylene nanocomposites, have utilized maleic anhydride grafted polypropylenes to achieve some success in the formation of nanocomposites.

For example, it is known to utilize exfoliated-clay filled nylon as a high impact plastic matrix, such as disclosed in U.S. Pat. No. 6,060,549 to Li et al. In particular, Li et al. disclose a blend of a thermoplastic resin such as nylon and a copolymer of a $C_4$ to $C_7$ isoolefin and a para-methylstyrene and a para-(halomethylstyrene), the blend also including nylon-containing exfoliated clays that are used as a high impact material. Further, Japanese Unexamined Application P2000-160024 by Yuichi et al. discloses a thermoplastic elastomer composition which can be used as an air barrier, including a blend similar to that disclosed in Li et al.

Elastomeric nanocomposite innerliners and innertubes have also been formed using a complexing agent and a rubber, where the agent is a reactive rubber having positively charged groups and a layered silicate uniformly dispersed therein. See, for example, Kresge et al. U.S. Pat. No. 5,665,183 and U.S. Pat. No. 5,576,373. This approach uses pre-formed positively charged reactive rubber components.

Nanocomposites have also been formed using non-ionic, brominated copolymers of isobutylene and para-methylstyrene, and blends of these copolymers with other polymers. See, for example, Elspass et al. U.S. Pat. No. 5,807,629 and U.S. Pat. No. 6,034,164.

The isobutylene-p-methylstyrene copolymers, a variety of functionalized derivatives thereof, and BIMSM in particular, are useful in various processes for making clay nanocomposites. See, for example, U.S. application Ser. No. 11/183,361, Split-Stream Process for Making Nanocomposites, by W. Weng et al., filed Jul. 18, 2005; and U.S. application Ser. No. 11/184,000, Functionalized Isobutylene Polymer-Inorganic Clay Nanocomposites and Organic-Aqueous Emulsion Process, by W. Weng et al., filed Jul. 18, 2005.

There still exists a need to improve exfoliation of the clay, processability of the nanocomposites, and final product properties.

SUMMARY OF THE INVENTION

It has been found that the blending of the nanocomposites and exfoliation of the clay can be enhanced by blending a low molecular weight elastomeric polymer into the mixture when forming the nanocomposite. The use of a low molecular weight elastomer can enhance exfoliation, and can allow manipulation of melt properties and processability characteristics of the nanocomposites, such as viscosity, relaxation characteristics, green strength, and other physical properties. Improvements in permeability can also be realized. Many physical properties of end use products formed with a blend of low and high molecular weight elastomers can be comparable to those of nanocomposites formed with an elastomer of high molecular weight as the final nanocomposite blend typically undergoes a curing or vulcanization process, crosslinking the low molecular weight chains with the high molecular weight chains in the polymer matrix. The final nanocomposite can be used as an air barrier, such as in innerliners and innertubes.

In one embodiment the invention provides an elastomeric nanocomposite of (i) a blend of from 5 to 95 parts per hundred rubber (phr) high molecular weight elastomer having a weight average molecular weight greater than 250000, (ii) from 5 to 95 phr functionalized low molecular weight elastomer having a weight average molecular weight less than 150000 and intercalated clay particles dispersed in the blend.

In an embodiment, at least one of the high and low molecular weight elastomers comprises a $C_4$ to $C_7$ isoolefin based elastomer, which can be halogenated. The isoolefin based polymer may include a styrenic comonomer, such as, for example, styrene, α-methylstyrene, alkylstyrene (ortho, meta, or para) wherein the alkyl is any $C_1$ to $C_5$ alkyl or branched chain alkyl, and combinations thereof, and especially para-methylstyrene. The isoolefin based polymer can optionally include a multiolefin comonomer, such as, for example, a $C_4$ to $C_{14}$ conjugated diene or β-pinene, especially isoprene.

In an embodiment, the low molecular weight elastomer includes a copolymer of from 80 to 99.5 mole percent (mol. %) $C_4$ to $C_7$ isoolefin and from 0.5 to 20 mol. % para-alkylstyrene, especially when the high molecular weight elastomer includes a copolymer of from 80 to 99.5 mol. % isobutylene and from 0.5 to 20 mol. % para-methylstyrene. Preferably, in one embodiment, the low molecular weight elastomer comprises at least 5 mol. % of the para-methylstyrene groups. Further, from 1 to 60 mol. % of the para-methylstyrene groups in the high and low molecular weight elastomers can be functionalized with a functional group selected from halides, ethers, amines, amides, esters, acids, and hydroxyls, and in particular the functionalized para-methylstyrene groups can be halogenated. In another embodiment, the low molecular weight elastomer comprises at least 1 mol. % halogenated para-methylstyrene.

In an embodiment, the clay particles can be present at from 1 to 25 phr or from 5 to 25 phr. The elastomeric composition can, if desired, also include a secondary rubber.

In another embodiment, an elastomeric composition includes (A) a blend of (i) a first elastomer comprising an isobutylene based elastomer having a weight average molecular weight greater than 250000, and (ii) from 5 to 95 phr of a second elastomer comprising brominated poly-isobutylene-co-para-methylstyrene comprising from 2 to 20 weight percent (wt. %) para-methylstyrene, from 0.1 to 2 mol. % bromo-para-methylstyrene and a weight average molecular weight less than 150000; and (B) intercalated clay particles dispersed in the blend.

The first elastomer can be an interpolymer of a $C_4$ to $C_7$ isoolefin and an alkylstyrene. The first elastomer can be functionalized with functional groups such as halides, ethers, amines, amides, esters, acids, hydroxyls, and the like, and in particular the first elastomer can be brominated. In embodiments of the invention, the first elastomer comprises poly(isobutylene-co-p-methylstyrene) or poly(isobutylene-co-p-methylstyrene-co-p-bromomethylstyrene).

The clay can be an inorganic clay, or an organoclay, e.g. a silicate, smectite clay or the like. Smectite clays that can be mentioned include montmorillonite, nontronite, beidellite, bentonite, volkonskoite, laponite, hectorite, saponite, sauconite, magadite, kenyaite, stevensite, vermiculite, halloysite, hydrotalcite, or a combination thereof.

Fillers which may optionally be present in the nanocomposite include calcium carbonate, mica, silica, (large particle) silicates, talc, titanium dioxide, carbon black, and mixtures thereof, in the blend of the first and second elastomers. The nanocomposite may further include dyes, pigments, antioxidants, heat and light stabilizers, plasticizers, oils, or the like.

In one embodiment, the nanocomposite further includes an organic peroxide, zinc oxide, zinc stearate, stearic acid, an accelerator, a vulcanizing agent, or mixture thereof, in the blend of the first and second elastomers. A curative can be dispersed in the blend, and in one embodiment the blend is cured.

In one particular embodiment, the first elastomer comprises poly(isobutylene-co-p-methylstyrene-co-p-bromomethylstyrene) and the second elastomer comprises at least 5 wt. % para-methylstyrene, at least 0.2 mol. % p-bromomethylstyrene and a weight average molecular weight from 25000 to 125000. In this embodiment, the second elastomer preferably comprises at least 1 mol. % p-bromomethylstyrene.

In another embodiment, the invention provides a method of preparing a clay nanocomposite of a high molecular weight elastomer having a weight average molecular weight above 250000, such as described above. The method includes the step of blending the high molecular weight elastomer with clay particles, such as described above, and an effective amount of a functionalized low molecular weight elastomer having a weight average molecular weight less than 150000, such as described above, to disperse and intercalate the clay particles in the blend. The blend can comprise from 5 to 95 phr of the high molecular weight elastomer and from 5 to 95 phr of the functionalized low molecular weight elastomer, for example. The blending can be effected in several embodiments such as solution blending, emulsion processing, melt blending, or the like. The method can also include melt processing and curing of the blend to form a useful article such as an air barrier or an article including the cured blend as an air barrier, for example.

In further embodiments, the present invention provides a nanocomposite formed by the method just described, and useful articles made of the nanocomposite such as inner tubes and tire innerliners.

DETAILED DESCRIPTION

Figure 1:
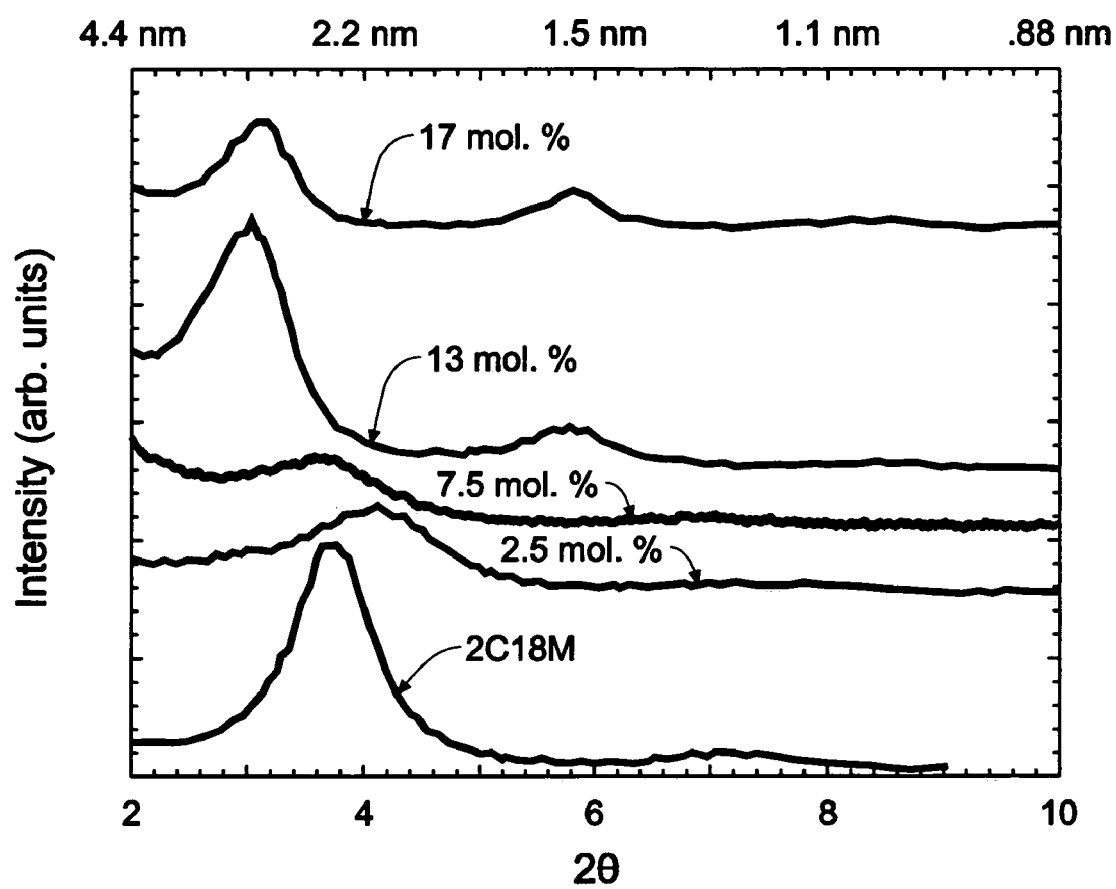
FIG. 1 shows an X-ray diffraction of dimethyl-dioctadecyl ammonium substituted montmorillonite (2C18M) and its blends with isobutylene-para-methylstyrene copolymers (IMSMs) with para-methylstyrene (PMS) contents of 2.5, 7.5, 13 and 17 mol. %, demonstrating that phase-separated macrocomposites resulted at less than 7.5 mol. % PMS, whereas with increasing PMS content the diffraction was characteristic of an increasing disorder in the tactoid size.

This invention describes a process for making polymer/clay nanocomposites. The process can produce a nanocomposite of a halogenated elastomer and a clay, desirably an exfoliated clay, suitable for use as an air barrier. The nanocomposite formed by the process of this invention has improved air barrier properties and is suitable for use as an innerliner or innertube.

Definitions

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber."

As used herein, "phr" is 'parts per hundred rubber' and is a measure common in the art wherein components of a composition are measured relative to a major elastomer component, based upon 100 parts by weight of the elastomer(s) or rubber(s).

As used herein, "isobutylene based elastomer" or "isobutylene based polymer" refers to elastomers or polymers comprising at least 70 mol. % repeat units from isobutylene. Similarly, "isoolefin based elastomer" or "isoolefin based polymer" refers to elastomers or polymers comprising at least 70 mol. % repeat units from isoolefin.

As used herein, "isoolefin" refers to any olefin monomer having at least one carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a polymer is present between each layer of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "exfoliation" refers to the separation of individual layers of the original inorganic particle, so that polymer can surround or surrounds each particle. In an embodiment, sufficient polymer is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "suspension" refers to a system consisting of a solid dispersed in a solid, liquid, or gas usually in particles of larger than colloidal size.

As used herein, "emulsion" refers to a system consisting of a liquid or liquid suspension dispersed with or without an emulsifier in an immiscible liquid usually in droplets of larger than colloidal size.

As used herein, "hydrocarbon" refers to molecules or segments of molecules containing primarily hydrogen and carbon atoms. In some embodiments, hydrocarbon also includes halogenated versions of hydrocarbons and versions containing herteroatoms as discussed in more detail below.

Elastomer

The nanocomposite of the present invention includes in one embodiment at least one elastomer comprising $C_4$ to $C_7$ isoolefin derived units. The elastomer can be halogenated. The isoolefin may be a $C_4$ to $C_7$ compound, in one embodiment selected from isobutylene, 2-methyl-1-butene, 3-methyl-1-butene, 2-methyl-2-butene, and 4-methyl-1-pentene. The elastomer may also include other monomer derived units. In one embodiment, the elastomer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. In another embodiment, the elastomer includes at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-fulvene, hexadiene, cyclopentadiene, methylcyclopentadiene, piperylene and combinations thereof.

In one embodiment, the elastomer includes an isoolefin derived unit, a multiolefin derived unit, and a styrenic derived unit. In another embodiment, the elastomer includes an isoolefin derived unit and a styrenic derived unit, and in yet another embodiment the elastomer includes an isoolefin derived unit and a multiolefin derived unit.

The elastomers in one embodiment of the invention are random elastomeric copolymers of a $C_4$ to $C_7$ isoolefin, such as isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. In another embodiment of the invention, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

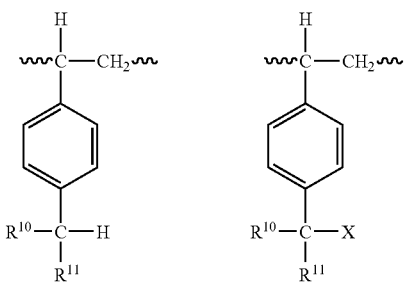

wherein $R^{10}$ and $R^{11}$ are independently hydrogen, lower alkyl, preferably $C_1$ to $C_7$ alkyl and primary or secondary alkyl halides and X is a functional group such as halogen. Preferably $R^{10}$ and $R^{11}$ are hydrogen. Up to 60 mol. % of the para-substituted styrene present in the interpolymer structure may be the functionalized structure above in one embodiment, and in another embodiment from 0.1 to 5 mol. %. In yet another embodiment, the amount of functionalized structure is from 0.4 to 1 mol. %.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines are described below.

Most useful of such functionalized materials are elastomeric random interpolymers of isobutylene and para-methylstyrene containing from 0.5 to 30 mol. % para-methylstyrene, wherein up to 60 mol. % of the methyl substituent groups present on the benzyl ring contain a bromine or chlorine atom, preferably a bromine atom (p-bromomethylstyrene), as well as a combination of p-bromomethylstyrene and other functional groups such as ester and ether. These halogenated elastomers are commercially available as EXXPRO™ Elastomers (ExxonMobil Chemical Company, Houston Tex.), and abbreviated as "BIMSM".

In a preferred embodiment, the functionality is selected such that it can react or form polar bonds with functional groups present in the matrix polymer, for example, acid, amino or hydroxyl functional groups, when the polymer components are mixed at high temperatures.

These functionalized interpolymers have a substantially homogeneous compositional distribution such that at least 95% by weight of the polymer has a p-alkylstyrene content within 10% of the average p-alkylstyrene content of the polymer. Desirable interpolymers are also characterized by a narrow molecular weight distribution ($M_w/M_n$) of less than 5, more preferably less than 2.5.

The interpolymers can also be characterized by a preferred viscosity average molecular weight in the range of from 2,000 up to 2,000,000 and a preferred number average molecular weight in the range of from 2500 to 750,000 as determined by gel permeation chromatography. In particular embodiments it may be preferable to utilize two or more interpolymers having a similar backbone, for example, a low molecular weight BIMSM interpolymer having a weight average molecular weight less than 150,000 can be blended with a high molecular weight BIMSM interpolymer having a weight average molecular weight greater than 250,000.

The BIMSM polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMSM polymers are brominated polymers that generally contain from 0.1 to 5 mol. % of bromomethylstyrene groups relative to the total amount of monomer derived units in the polymer. In another embodiment, the amount of bromomethylstyrene groups is from 0.2 to 3.0 mol. %, and from 0.3 to 2.8 mol. % in yet another embodiment, and from 0.4 to 2.5 mol. % in yet another embodiment, and from 0.3 to 2.0 in yet another embodiment, wherein a desirable range may be any combination of any upper limit with any lower limit. Expressed another way, preferred copolymers contain from 0.2 to 10 wt. % of bromine, based on the weight of the polymer, from 0.4 to 6 wt. % bromine in another embodiment, and from 0.6 to 5.6 wt. % in another embodiment, and are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and p-(halomethylstyrene) derived units, wherein the p-(halomethylstyrene) units are present in the interpolymer from 0.4 to 3.0 mol. % based on the total number of p-methylstyrene, and wherein the p-methylstyrene derived units are present from 3 wt. % to 15 wt. % based on the total weight of the polymer in one embodiment, and from 4 wt. % to 10 wt. % in another embodiment. In another embodiment, the p-halomethylstyrene is p-bromomethylstyrene.

The halogenated elastomer useful in the present invention may also include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of a $C_4$ to $C_7$ isoolefin and a multiolefin. In another embodiment, the halogenated rubber component is a blend of a polydiene or block copolymer, and a copolymer of a $C_4$ to $C_7$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. No. 4,074,035 and U.S. Pat. No. 4,395,506; isoprene and halogenated isobutylene copolymers, polychloroprene, and the like, and mixtures of any of the above. Some embodiments of the halogenated rubber component are also described in U.S. Pat. No. 4,703,091 and U.S. Pat. No. 4,632,963.

More particularly, in one embodiment of the brominated rubber component of the invention, a halogenated butyl rubber is used. The halogenated butyl rubber is produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared by reacting a comonomer mixture, the mixture having at least (1) a $C_4$ to $C_7$ isoolefin monomer component such as isobutylene with (2) a multiolefin, or conjugated diene, monomer component. The isoolefin is in a range from 70 to 99.5 wt. % by weight of the total comonomer mixture in one embodiment, and 85 to 99.5 wt. % in another embodiment. The conjugated diene component in one embodiment is present in the comonomer mixture from 30 to 0.5 wt. % in one embodiment, and from 15 to 0.5 wt. % in another embodiment. In yet another embodiment, from 8 to 0.5 wt. % of the comonomer mixture is conjugated diene.

The isoolefin is a $C_4$ to $C_7$ compound such as isobutylene, 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 wt. % of isobutylene with 0.5 to 8 wt. % isoprene, or reacting 95 to 99.5 wt. % isobutylene with from 0.5 to 5.0 wt. % isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen content is from 0.1 to 10 wt. % based in on the weight of the halogenated butyl rubber in one embodiment, and from 0.5 to 5 wt. % in another embodiment. In yet another embodiment, the halogen wt. % of the halogenated butyl rubber is from 1 to 2.2 wt. %.

In another embodiment, the halogenated butyl or star-branched butyl rubber may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. No. 4,632,963; U.S. Pat. No. 4,649,178; and U.S. Pat. No. 4,703,091. Thus, in one embodiment of the invention, the halogenated butyl rubber is such that the halogenated multiolefin units are primary allylic halogenated units, and wherein the primary allylic configuration is present to at least 20 mol. % (relative to the total amount of halogenated multiolefin) in one embodiment, and at least 30 mol. % in another embodiment. This arrangement can be described by the structure:

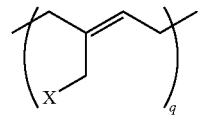

wherein X is a halogen, desirably chlorine or bromine, and q is at least 20 mol. % based on the total moles of halogen in one embodiment, and at least 30 mol. % in another embodiment, and from 25 mol. % to 90 mol. % in yet another embodiment.

A commercial embodiment of the halogenated butyl rubber of the present invention is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 wt. % relative to the Bromobutyl 2222. Further, cure characteristics of Bromobutyl 2222 are as follows: MH is from 28 to 40 dN·m, ML is from 7 to 18 dN·m (ASTM D2084, modified). Another commercial embodiment of the halogenated butyl rubber is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 wt. %. Further, cure characteristics of Bromobutyl 2255 are as follows: MH is from 34 to 48 dN·m, ML is from 11 to 21 dN·m (ASTM D2084, modified). The invention is not limited to the commercial source of any of the halogenated rubber components.

In another embodiment of the brominated rubber component of the invention, a branched or "star-branched" halogenated butyl rubber is used. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. No. 4,074,035, U.S. Pat. No. 5,071,913, U.S. Pat. No. 5,286,804, U.S. Pat. No. 5,182,333 and U.S. Pat. No. 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt. %, at greater than 0.3 wt. % in one embodiment, and from 0.3 to 3 wt. % in another embodiment, and from 0.4 to 2.7 wt. % in yet another embodiment.

A commercial embodiment of the SBHR of the present invention is Bromobutyl 6222 (ExxonMobil Chemical Company), having a Mooney Viscosity (ML 1+8 at 125° C., ASTM 1646, modified) of from 27 to 37, and a bromine content of from 2.2 to 2.6 wt. % relative to the SBHR. Further, cure characteristics of Bromobutyl 6222 are as follows: MH is from 24 to 38 dN·m, ML is from 6 to 16 dN·m (ASTM D2084, modified).

The halogenated rubber component is present in the blend of the invention from 10 to 90 phr in one embodiment, from 20 to 80 phr in another embodiment, and from 30 to 70 phr in yet another embodiment, wherein a desirable range may be any combination of any upper phr limit with any lower phr limit.

Functionalized Halogenated Oligomers and Elastomers

The halogen in the above described halogenated polymer can react or form polar bonds with functional groups present in the matrix polymer. For example, the bromine can react with acid, amino or hydroxyl functional groups when the components are mixed at high temperatures.

One embodiment of the present invention is a nanocomposite comprising a clay and a halogenated elastomer comprising $C_4$ to $C_7$ isoolefin derived units; wherein a portion of the halogen in the elastomer is electrophilically substituted with an amine-functionalized group such that the halogenated elastomer also comprises an amine-functionalized monomer unit described by the following group pendant to the elastomer E:

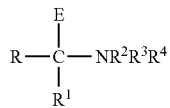

wherein R and $R^1$ are the same or different and are selected from hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions. In a desirable embodiment, at least one of $R^2$, $R^3$ and $R^4$ are selected from $C_1$ to $C_{20}$ alkenes, $C_1$ to $C_{20}$ aliphatic alcohols, $C_1$ to $C_{20}$ aliphatic ethers, $C_1$ to $C_{20}$ carboxylic acids, nitriles, ethoxylated amines, acrylates, esters and ammonium ions.

In one embodiment, the halogenated elastomer E comprises $C_4$ to $C_7$ isoolefin derived units, para-methylstyrene derived units and para-(halomethylstyrene) derived units.

In another embodiment, the halogenated elastomer E comprises $C_4$ to $C_7$ isoolefin derived units, multiolefin derived units, and halogenated multiolefin derived units.

The functional group pendant to the elastomer E can be further described as functionalized amine, wherein at least one of $R^2$, $R^3$ and $R^4$ is selected from $C_1$ to $C_{20}$ aliphatic alcohols or ethers, $C_1$ to $C_{20}$ carboxylic acids, nitriles, esters, ammonium ions, or acrylate groups; wherein the acrylate is described by the following formula:

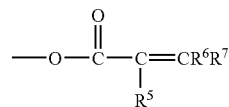

wherein $R^5$, $R^6$ and $R^7$ are the same or different and are selected from hydrogen and $C_1$ to $C_7$ alkyl or alkenyl.

In another embodiment, the amine-functionalized group is selected from ethoxylated amines having the following structure:

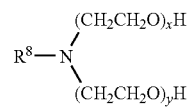

wherein $R^8$ is a $C_1$ to $C_{20}$ alkyl; and wherein x+y is 2, 5, 10, 15, or 50.

In another embodiment, the amine-functionalized group is selected from dimethylaminoethylacrylate, dimethylaminomethylacrylate, N-methylamino-bis-2-propanol, N-ethylamino-bis-2-propanol, dimethylaminoethylmethacrylate, diethylaminopropanol, diethylethanolamine, dimethylamino-1-propanol, tripropanolamine, triethanolamine, aminolauric acid, betaine, and combinations thereof.

The amine-functionalized derived unit may be present on the halogenated elastomer from 0.01 wt. % to 10 wt. % of the elastomer in one embodiment, and from 0.1 wt. % to 8 wt. % in another embodiment, and from 0.2 to 6 wt. % in yet another embodiment, wherein a desirable range may be any combination of any upper wt. % limit with any lower wt. % limit.

The combined polymer component of the nanocomposites of the present invention may comprise at least one polymer or elastomer as described in any of the above polymer or elastomers or may comprise any combination of at least two or more of the polymers and elastomers described above. In an embodiment, the elastomer or polymer comprises at least one isobutylene-based polymer. In another embodiment, the elastomer or polymer comprises at least one isobutylene-based polymer and at least one other rubber. In yet another embodiment, the elastomer or polymer comprises at least two or more isobutylene-based polymers.

Secondary Rubber Component

A secondary rubber or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product used in the composition is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. No. 5,162,445; U.S. Pat. No. 407,035; and U.S. Pat. No. 4,395,506; halogenated isoprene and halogenated isobutylene copolymers, polychloroprene, and the like, and mixtures of any of the above. Some embodiments of the halogenated rubber component are also described in U.S. Pat. No. 4,703,091 and U.S. Pat. No. 4,632,963.

In one embodiment of the invention, a so called semicrystalline copolymer ("SCC") is present as the secondary "rubber" component. Semi-crystalline copolymers are described in WO 00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range up to 90 phr in one embodiment, up to 50 phr in another embodiment, up to 40 phr in another embodiment, and up to 30 phr in yet another embodiment. In yet another embodiment, the secondary rubber is present from at least 2 phr, from at least 5 phr, from at least 10 phr, from at least 20 phr, from at least 30 phr, or from at least 40 phr. A desirable embodiment may include any combination of any upper phr limit and any lower phr limit wherein the upper phr limit is above the lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Fillers, Curatives and Other Additives

The composition of the invention may also include one or more filler components such as calcium carbonate, clay, mica, silica and silicates, talc, titanium dioxide, and carbon black. As used herein, fillers do not include inorganic clay and/or organoclay particles forming part of the nanocomposite matrix, e.g. clay particles having a dimension in the nanometer range, but larger clay particles can be used as a filler in the nanocomposites, if desired. In one embodiment, the filler is carbon black or modified carbon black. The preferred filler is semi-reinforcing grade carbon black present at a level of from 10 to 150 phr of the blend, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD (diphenyl phenylene diamine), salicylic acid (2-hydroxybenzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the nanocomposite.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

Clays

The nanocomposites of the present invention can include swellable inorganic clay. Swellable layered inorganic clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay can be exfoliated by suspending the clay in a water solution. Preferably, the concentration of clay in water is sufficiently low to minimize the interaction between clay particles and to fully exfoliate the clay. In one embodiment, the aqueous slurry of clay can have a clay concentration of between 0.1 and 5.0 wt. %; between 0.1 and 3.0 wt. % in other embodiments.

In certain embodiments, an aqueous slurry of clay can be prepared by stirring clay and water at room temperature for a time sufficient to exfoliate the clay. In one embodiment, the clay and water can be stirred for between 0.25 and 24 hours. The clay and water can be stirred for between 4 and 16 hours, or between 10 and 14 hours, in other embodiments.

In other embodiments, the clay can be mixed with an organic liquid to form a clay dispersion. The clay can be an inorganic clay or an organically modified clay; the organic liquid can be miscible or immiscible in water. In certain embodiments, the dispersion can have a clay concentration of between 0.1 and 5.0 wt. %; between 0.1 and 3.0 wt. % in other embodiments.

The layered clay can also be intercalated and exfoliated by treatment with organic molecules (swelling or exfoliating "agents" or "additives") capable of undergoing ion exchange reactions with the cations present at the interlayer surfaces of the layered silicate. Suitable exfoliating additives include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides.

Desirable amine compounds (or the corresponding ammonium ion) are those with the structure $R^{12}R^{13}R^{14}N$, wherein $R^{12}$, $R^{13}$, and $R^{14}$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^{12}$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R^{18}R^{19}N—R^{20}—NR^{21}R^{22}$, wherein $R^{18}$, $R^{19}$, $R^{20}$, $R^{21}$, and $R^{22}$ are the same or different $C_1$ to $C_{30}$ alkyls or alkenes, or $C_1$ to $C_{20}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, N,N,N'-trimethyl-N'-tallow-1,3-diaminopropane, and so on.

Another class of exfoliating additives include those which can be covalently bonded to the interlayer surfaces. These include polysilanes of the structure $—Si(R^{15})_2R^{16}$ where $R^{15}$ is the same or different at each occurrence and is selected from alkyl, alkoxy or oxysilane and $R^{16}$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. No. 4,472,538, U.S. Pat. No. 4,810,734, U.S. Pat. No. 4,889,885 as well as WO 92/02582.

In a preferred embodiment of the invention, the exfoliating additive or additives are capable of reaction with the halogen sites on the interpolymer to form complexes which help exfoliate the clay. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, and from 0.2 to 15 phr in yet another embodiment, and from 0.3 to 10 phr in yet another embodiment. The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another embodiment.

In another embodiment of the invention, improved interpolymer impermeability is achieved by the presence of at least one polyfunctional curative. An embodiment of such polyfunctional curatives can be described by the formula $Z—R^{17}—Z'$, wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the swelling agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of clay or exfoliated clay incorporated in the nanocomposites in accordance with this invention is sufficient to develop an improvement in the mechanical properties or barrier properties of the nanocomposite, for example, tensile strength or oxygen permeability. Amounts of clay in the nanocomposite generally will range from 0.5 to 10 wt. % in one embodiment, and from 1 to 5 wt. % in another embodiment, based on the polymer content of the nanocomposite. Expressed in parts per hundred rubber, the clay or exfoliated clay may be present from 1 to 30 phr in one embodiment, and from 5 to 20 phr in another embodiment.

Nanocomposite Processing

Elastomer—clay nanocomposites can be formed using a variety of processes, such as solution blending, melt blending, or an emulsion process. For example, in commonly assigned U.S. application Ser. No. 11/184,000, Functionalized Isobutylene Polymer-Inorganic Clay Nanocomposites and Organic-Aqueous Emulsion Process, by W. Weng et al., filed Jul. 18, 2005, there is disclosed a method for preparing clay-butyl rubber nanocomposites from an emulsion of rubber solution and aqueous clay dispersion in which the clay can be an inorganic clay. As another example of nanocomposite processing, in commonly assigned U.S. application Ser. No. 11/183,361, Split-Stream Process for Making Nanocomposites, by W. Weng et al., filed Jul. 18, 2005, there is disclosed a method for preparing clay-butyl rubber nanocomposites by preparing a concentrated nanocomposite from a slipstream of the rubber and blending the concentrate with a main rubber stream.

Melt Blending:

The nanocomposite of the present invention can be formed by a polymer melt blending process, such as that described in PCT/US05/22714, Polymeric Nanocomposites and Processes for Making the Same, by Weng et al., filed Jun. 28, 2005, for example. Blending of the components can be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite.

Emulsion Processes:

The nanocomposite of the present invention can also be formed by an emulsion processes. In one embodiment, the emulsion process can comprise mixing an aqueous slurry of inorganic clay with a polymer solution (cement). The mixing should be sufficiently vigorous to form emulsions or microemulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered clay with Solution B comprising a solvent and at least one elastomer; and removing the solvent and water from the contact product of Solution A and Solution B to recover a nanocomposite. In certain embodiments, the emulsion is formed by subjecting the mixture to agitation using a high-shear mixer.

In some embodiments, a nanocomposite is produced by a process comprising contacting Solution A comprising water and at least one layered clay with Solution B comprising a solvent and at least one elastomer, wherein the contacting is performed in the presence of an emulsifier or surfactant.

The emulsions of the present invention are formed by conventional emulsion technology, that is, subjecting a mixture of the hydrocarbon, water and surfactant, when used, to sufficient shearing, as in a commercial blender or its equivalent for a period of time sufficient for forming the emulsion, e.g., generally at least a few seconds. For general emulsion information, see generally, "Colloidal Systems and Interfaces", S. Ross and I. D. Morrison, J. W. Wiley, NY, 1988. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 wt. % of the total emulsion, more preferably about 0.001 to about 3 wt. %, and most preferably 0.01 to less than 2 wt. %.

Cationic surfactants useful in preparing the emulsions of this invention include tertiary amines, diamines, polyamines, amine salts, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending:

The nanocomposite of the present invention can also be formed by solution blending. In certain embodiments, a nanocomposite is produced by a process comprising contacting Solution A comprising a solvent comprising a hydrocarbon and at least one layered filler or clay with Solution B comprising a solvent and at least one elastomer, and removing the solvents from the contact product of Solution A and Solution B to form a nanocomposite.

In the previous embodiments, the layered filler may be a layered clay treated with organic molecules as described above. In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In the embodiments described above, solvents may be present in the production of the nanocomposite composition from 30 to 99 wt. %, alternatively from 40 to 99 wt. %, alternatively from 50 to 99 wt. %, alternatively from 60 to 99 wt. %, alternatively from 70 to 99 wt. %, alternatively from 80 to 99 wt. %, alternatively from 90 to 99 wt. %, alternatively from 95 to 99 wt. %, based upon the total wt of the composition.

Additionally, in certain embodiments, when two or more solvents are prepared in the production of the nanocomposite composition, each solvent may comprise from 0.1 to 99.9 volume percent (vol. %), alternatively from 1 to 99 vol. %, alternatively from 5 to 95 vol. %, and alternatively from 10 to 90 vol. %, with the total volume of all solvents present at 100 vol. %.

Nanocomposite Blend with Low- and High-Molecular Weight Elastomers

In some embodiments of the present invention, a nanocomposite can be formed by intimately mixing a low-molecular weight elastomer, a high molecular weight elastomer, and a clay according to one of the blending processes described above. The use of a low molecular weight elastomer can enhance exfoliation, and can allow manipulation of melt properties and processability characteristics of the nanocomposites, such as viscosity, relaxation characteristics, green strength, and other physical properties. Properties of any end use product formed with a blend of low- and high-molecular weight elastomers are generally comparable to those formed with an elastomer of intermediate or high molecular weight as the final blend typically undergoes a curing or vulcanization process, cross-linking the low molecular weight chains with the high molecular weight chains in the polymer matrix.

In one embodiment, the nanocomposite can be formed by blending all components in a single stage. The nanocomposite can also be formed by blending the components in stages, such as blending the low molecular weight elastomer and the clay, and blending the resulting mixture with a high molecular weight elastomer. In other embodiments, the high and low molecular weight elastomers can be combined and blended with a clay. In other embodiments, the high molecular weight elastomer and clay can be combined, and the resulting mixture combined with the low molecular weight elastomer.

As one example of the process to form a nanocomposite, a high molecular weight elastomer, a low molecular weight elastomer, and clay can be combined in a single melt blending stage to form a nanocomposite.

As another example, the low molecular weight elastomer and clay can be combined in a first melt blending stage. The resulting mixture can be combined with a high molecular weight elastomer in a second melt blending stage. In this manner, the clay can undergo at least one additional mixing stage, further dispersing and exfoliating the clay.

Processes with an additional melt blending stage can also allow manufacture and use of a low-molecular weight elastomer-clay masterbatch (pre-blend) for melt blending with the high molecular weight elastomer. For example, a low-molecular weight copolymer comprising isobutylene and halogenated alkylstyrene can be blended with 20 wt. % of a layered silicate to form a masterbatch, where the molecular weight of the copolymer is chosen to preferentially intercalate or exfoliate the layered silicate and form a nanocomposite. The masterbatch can then be diluted with a higher molecular weight elastomer so that the concentration of the layered silicate is in the desired range of 1 to 5 wt. %. The resulting mixture can be combined with a curing agent and cured to form a crosslinked nanocomposite.

The high molecular weight elastomer can be any of the polymers as described above, including functionalized and halogenated elastomers. Similarly, the low molecular weight elastomer can be any of the polymers as described above, including functionalized and halogenated elastomers. In certain embodiments, the high molecular weight elastomer has a similar polymer backbone to that of the low molecular weight elastomer so as to promote compatibility of the two polymers. In other embodiments, the high- and low-molecular weight elastomers contain functional groups to interact with and enhance the exfoliation of the clay.

In some embodiments, the low molecular weight elastomer can be a brominated isobutylene-para-methylstyrene copolymer. The composition of the brominated isobutylene-para-methylstyrene copolymer can affect the exfoliation of the clay and other polymer interactions, and can affect the relative amount of low-molecular weight polymer required in the mixture. For example, for a low molecular weight elastomer having a given bromine and/or para-methylstyrene content, the desired amount of exfoliation may require a mixture containing 10 wt. % low-molecular weight elastomer; whereas for a different bromine and/or para-methylstyrene content could result in the same degree of exfoliation using only 5 wt. % of the low-molecular weight elastomer in the mixture. This is explained in more detail in the examples below.

In still other embodiments, a nanocomposite formed from an above described process to improve the air impermeability of an elastomer has an oxygen transmission rate of 160 mm·cc/[m$^2$·day] at 40° C. or lower as measured on cured nanocomposite compositions or articles as described herein. Alternatively, the oxygen transmission rate is 150 mm·cc/[m$^2$·day] at 40° C. or lower as measured on cured nanocomposite compounds as described herein; the oxygen transmission rate is 140 mm·cc/[m$^2$·day] at 40° C. or lower as measured on cured nanocomposite compounds as described herein; the oxygen transmission rate is 130 mm·cc/[m$^2$·day] at 40° C. or lower as measured on cured nanocomposite compounds as described herein; the oxygen transmission rate is 120 mm·cc/[m2·day] at 40° C. or lower as measured on cured nanocomposite compounds as described herein; the oxygen transmission rate is 110 mm·cc/[m²·day] at 40° C. or lower as measured on cured nanocomposite compounds as described herein; the oxygen transmission rate is 100 mm·cc/[m²·day] at 40° C. or lower as measured on cured nanocomposite compounds as described herein; the oxygen transmission rate is 90 mm·cc/[m²·day] at 40° C. or lower as measured on cured nanocomposite compounds as described herein; the oxygen transmission rate is 80 mm·cc/[m²·day] at 40° C. or lower as measured on cured nanocomposite compounds as described herein; or, the oxygen transmission rate is 70 mm·cc/[m²·day] at 40° C. or lower as measured on cured nanocomposite compounds as described herein.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

Embodiments of the final nanocomposite of the present invention are useful as air barriers, such as used in producing innerliners for motor vehicles. In particular, the nanocomposites are useful in innerliners and innertubes for articles such as truck tires, bus tires, passenger automobile, motorcycle tires, and the like.

Permeability Testing

The nanocomposites can be analyzed for permeability properties using the following method. In certain embodiments, 36 grams of the clay-rubber mixture are loaded into a Brabender™ mixer at a temperature of 130-145° C. and mixed with 20 grams of carbon black (N660) for 7 minutes. The mixture is further mixed with a curatives package of 0.33 g stearic acid, 0.33 g Kadox® 911, and 0.33 g MBTS at 40° C. and 40 rpm for 3 minutes. The resulting rubber compounds are milled, compression molded and cured at 170° C. All specimens are compression molded with slow cooling to provide defect free pads. A compression and curing press is used for rubber samples. Typical thickness of a compression molded pad is around 15 mil. using an Arbor press, 2" diameter disks are then punched out from molded pads for permeability testing. These disks are conditioned in a vacuum oven at 60° C. overnight prior to the measurement. The oxygen permeation measurements are done using a Mocon™ OX-TRAN 2/61 permeability tester at 40° C. under the principle of R. A. Pasternak et. al. in 8 JOURNAL OF POLYMER SCIENCE: PART A-2 467 (1970). Disks thus prepared are mounted on a template and sealed with vacuum grease. Ten psi nitrogen is kept on one side of the disk, whereas the other side is 10 psi oxygen. Using the oxygen sensor on the nitrogen side, increase in oxygen concentration on the nitrogen side with time can be monitored. The time required for oxygen to permeate through the disk, or for oxygen concentration on the nitrogen side to reach a constant value, is recorded and used to determine the oxygen permeability. Permeability is measured as oxygen transmission rate on a Mocon™ WX-TRAN 2/61 at 40° C. Where multiple samples are prepared using the same procedure, permeation rates are given for each sample.

In certain embodiments, a useful formulation for property evaluation would be as follows:

| Material I.D. | Parts |
|---|---|
| Elastomer/Clay | 100 + x parts of clay |
| Carbon black N660 | 60.0 |
| Stearic Acid | 1.0 |
| ZnO Kadox ™ 911 | 1.0 |
| MBTS | 1.0 |

Carbon black N660 can be obtained from, e.g., Cabot Corp. (Billerica, Mass.). Stearic acid, a cure agent, can be obtained from, e.g., C. K. Witco Corp. (Taft, La.), Kadox® 911, an activator, can be obtained from C. P. Hall (Chicago, Ill.). MBTS, 2-mercaptobenzothiazole disulfide, can be obtained from R. T. Vanderbilt (Norwalk, Conn.) or Elastochem (Chardon, Ohio).

EXAMPLES

The p-bromomethylstyrene (BrPMS) and p-methylstyrene (PMS) contents of each of the brominated isobutylene para-methylstyrene copolymers (BIMSM) in these examples were determined using a Varian VXR 300 MHz spectrometer. Molecular weights were measured by gel permeation chromatography (GPC) with tetrahydrofuran (THF) as the mobile phase using a Waters' Alliance 2690 chromatograph equipped with UV and DRI detectors.

The blends of polymers with the layered silicates were prepared in toluene solutions containing 10 wt. % polymer. The polymer/layered silicate hybrids containing 10 wt. % layered silicate were cast from the toluene solution and annealed at 120° C. for 72 hours. The structures were examined by x-ray diffraction at room temperature using a Siemens D5000 X-Ray diffractometer with Cu—$K_\alpha$ radiation generated at 40 mA and 50 kV. Diffraction spectra were obtained over a 2θ range of 2° to 10° in steps of 0.02° and a counting time of 3 seconds at each angular position. In general, a shift in the peak intensity to a lower angle and especially a reduction in the peak intensity indicate a more random or dispersed orientation of the clay particles.

As described below, Example 3 of this invention shows that, for some embodiments, as little as 10% of a low molecular weight ($M_w$=70,000) BIMSM, when added to a high molecular weight BIMSM, achieves essentially the same processability improvement results as all low molecular weight. This low molecular weight component might be obtained through the addition of a separately formed BIMSM. Alternatively, it could be manufactured directly in the process, potentially by removing the triethylene glycol quenching agent from the overflow. Alternatively, it can be operated by multiple reactors where one is producing low molecular weight fraction at such a rate that the integrated volume produces at least 10% of the low molecular weight material.

Example 1A

Effects of Surfactant Modification and PMS Content

The organically modified layered silicates in this example included a dimethyl-dioctadecyl ammonium substituted montmorillonite (2C18M) from Southern Clay Products Inc. that had been extensively washed to remove any excess alkyl ammonium. Trimethyl-octadecyl ammonium modified montmorillonite (C18M) was also prepared. The montmorillonites used in this study were modified using alkyl ammonium surfactants and in particular only with saturated olefinic surfactants.

Montmorillonite-based nanocomposites with a series of isobutylene para-methylstyrene copolymers (IMSMs) having Mw of 400,000 were prepared from the modified silicates and the copolymers using the solution blending and annealing methods described above. Polymer/layered silicate hybrids were prepared containing 10 wt. % C18M or 2C18M.

Montmorillonite modified with single-tailed primary amine surfactants (C18M) did not mix with any of the IMSMs, even with higher PMS levels in the copolymer composition. These blends led to the formation of macrocomposites rather than nanocomposites, and serve to illustrate the specificity of the polymer/clay interaction.

On the other hand, the use of double-tailed (2C18) quaternary surfactant as the organophilic clay treatment allowed for the formation of intercalated nanocomposites with certain IMSMs. In particular, copolymers with a PMS content in excess of 7.5 mol. % in the hybrids prepared with the 2C18M formed intercalated structures, while hybrids prepared with IMSMs having less than 7.5 mol. % PMS formed phase-separated macrocomposites. With increasing PMS content, the structures of the 2C18M hybrids as studied by x-ray diffraction (see FIG. 1) suggest an increasing disorder in the tactoid size.

Example 1B

Effects of Particle Size

Figure 2:
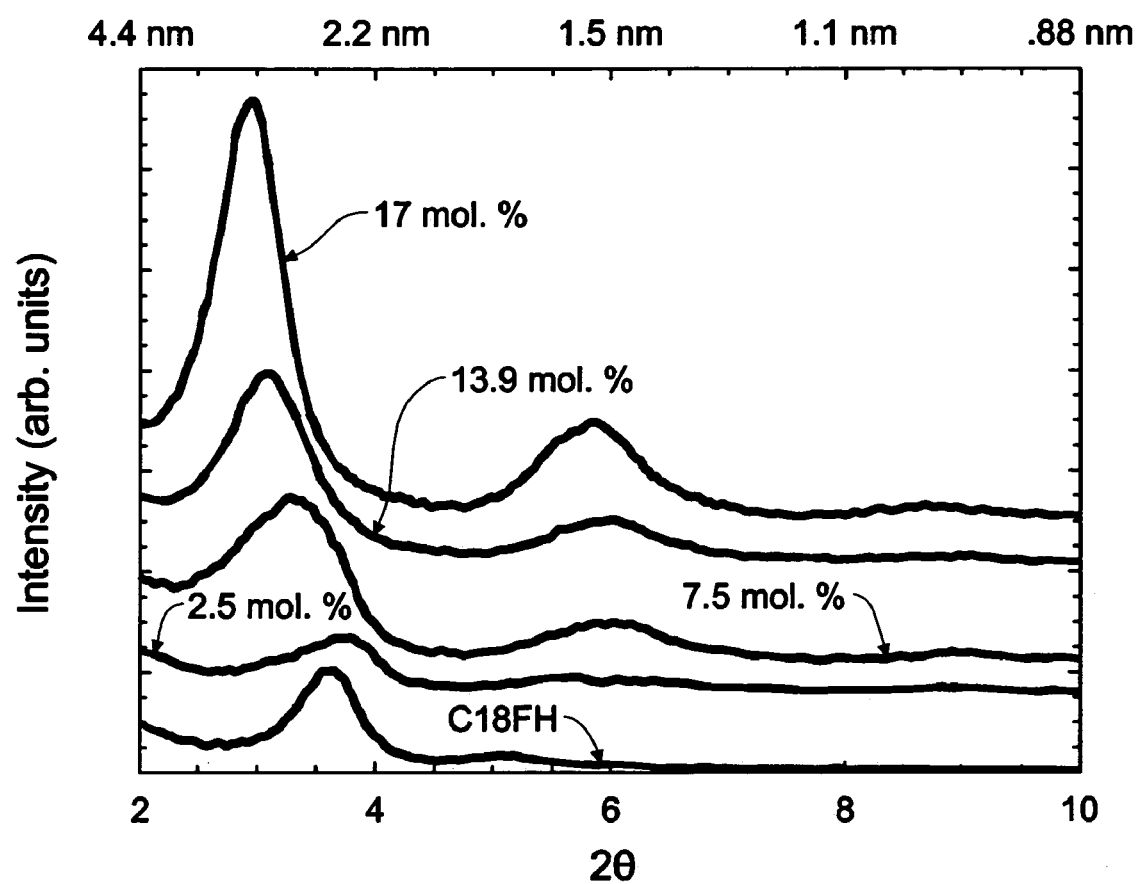
FIG. 2 shows an X-ray diffraction of C18 quaternary surfactant-treated fluorohectorite (C18FH) and its 10 wt. % blends with isobutylene-para-methylstyrene copolymers (IMSMs) with para-methylstyrene (PMS) contents of 2.5, 7.5, 13.9 and 17 mol. %, demonstrating that immiscible composites were formed at less than 7.5 mol. % PMS, whereas at greater PMS contents highly ordered intercalated hybrids were formed.

In this example, nanocomposites were prepared with thermodynamically equivalent (or nearly equivalent) organically modified layered silicates based on laponite and fluorohectorite. The polymer/layered silicate hybrids containing 10 wt. % $C_{18}$ quaternary surfactant-treated fluorohectorite (C18FH) or di-$C_{18}$ quaternary surfactant-treated laponite (2C18L) were cast from a solution of IMSM (Mw=400,000) and annealed as described above. The x-ray diffraction results for the C18FH itself and its 10 wt. % blends with IMSM are shown in FIG. 2.

Montmorillonite, laponite and fluorohectorite all belong to the 2:1 class of layered silicates and primarily differ in their lateral dimensions and hence the anisotropy associated with them. The lateral disk diameters of montmorillonite, and laponite are approximately 500-1000 and 30 nm, respectively. Fluorohectorite is polydisperse, with a platelet diameter ranging from several nm all the way up to about 1 μm (micro meter). Similar to the 2C18 montmorillonite, the 2C18-substituted laponite and the C18-substituted fluorohectorite formed immiscible composites with IMSMs when the PMS content was less than 7.5 mol. %. On the other hand, they formed intercalated or disordered nanocomposites with IMSMs when the PMS contents were greater than 7.5 mol. %. In the case of laponite, disordered hybrids were formed. In the case of fluorohectorite, highly ordered intercalated hybrids were formed.

Example 2

Effects of BrPMS Content in BIMSM

Figure 3:
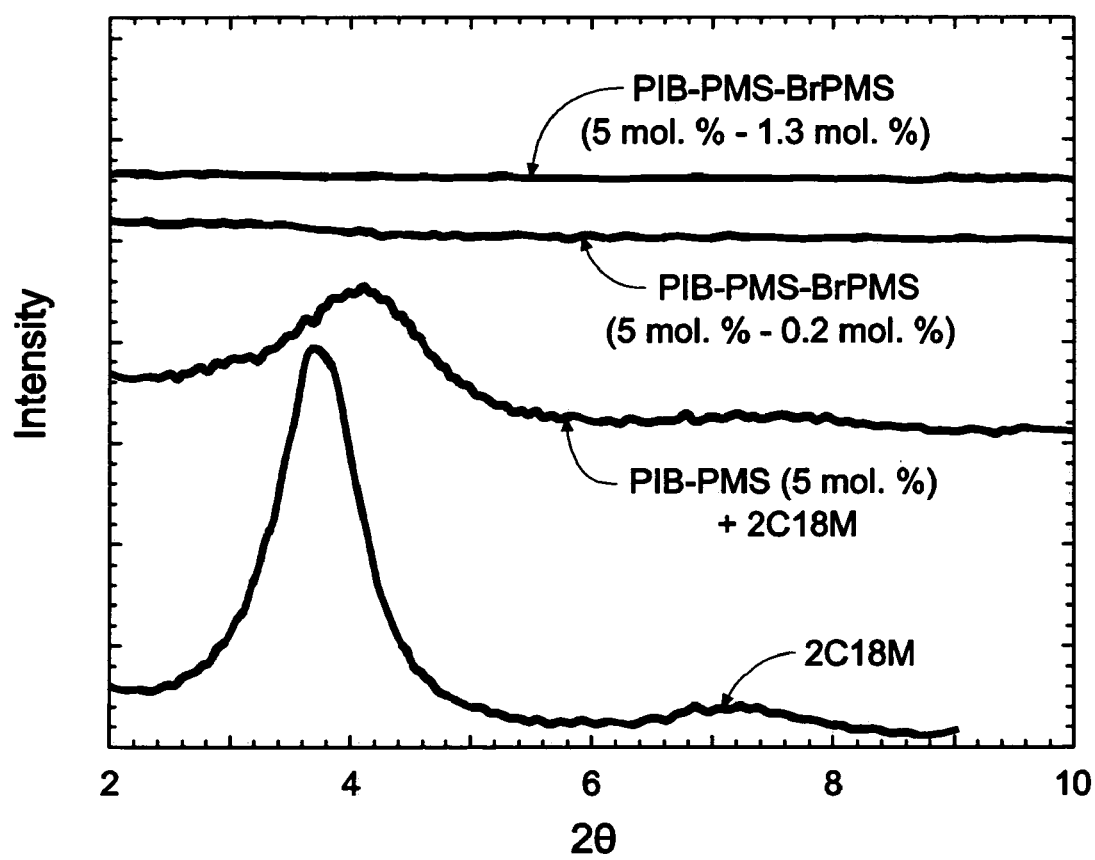
FIG. 3 shows an X-ray diffraction of 2C18M and blends thereof at 10 wt. % with IMSM and partially brominated IMSM (BIMSM), with a para-methylstyrene (PMS) content of 5 mol. % and BrPMS contents of 0, 0.2 and 1.3 mol. %, demonstrating that phase-separated macrocomposites resulted at low BrPMS contents and 5 mol. % PMS.

Montmorillonite-based nanocomposites with a series of IMSM and two BIMSMs were prepared by solution blending, casting and annealing as described above. The layered silicate was the 2C18M from Example 1A. The IMSM and the two BIMSMs had an Mw of 400,000 and 5 mol. % PMS that was not brominated. One BIMSM had 0.2 mol. % BrPMS, and the other had 1.3 mol. % BrPMS. The x-ray diffraction results shown in FIG. 3 indicate that low levels of bromination can reduce the amount of PMS needed for good dispersion of the layered silicate.

Example 3

Effects of Molecular Weight of BIMSM

Figure 4:
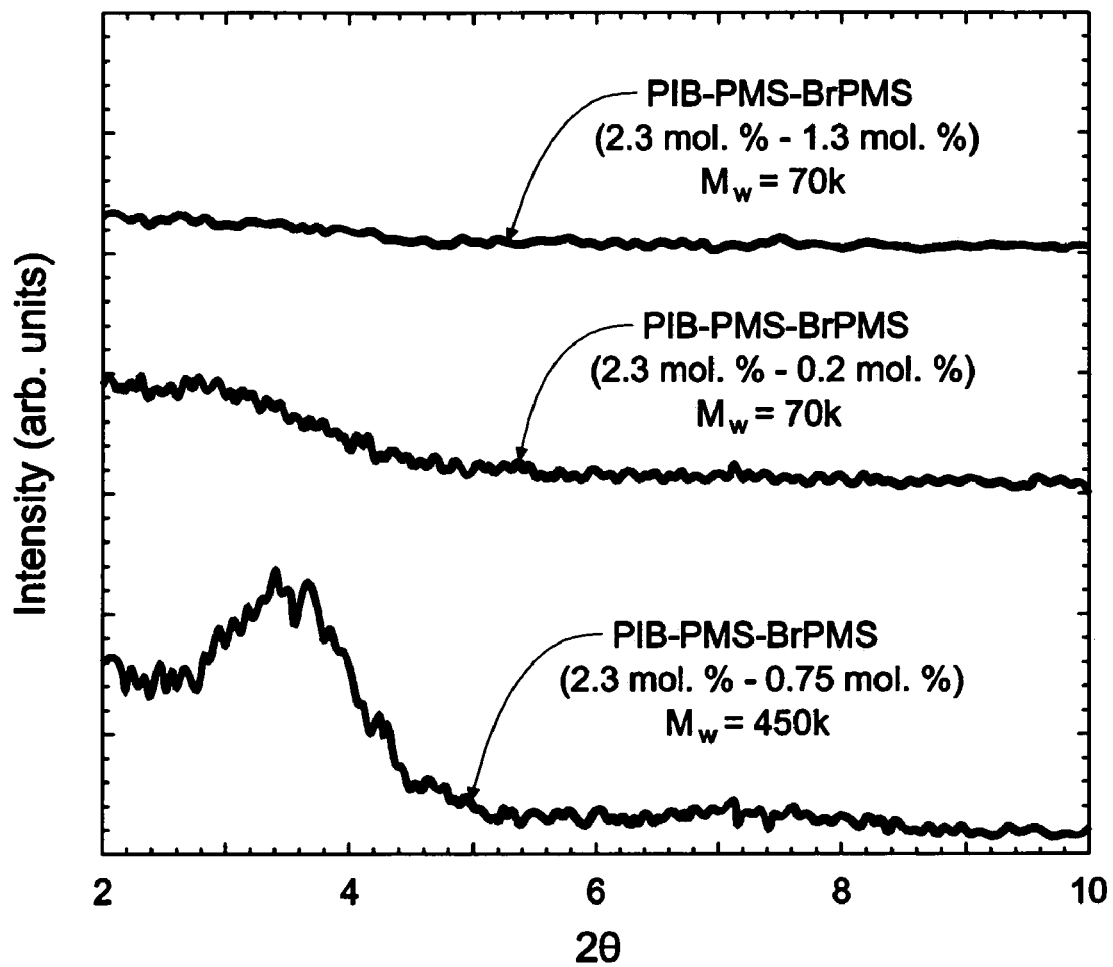
FIG. 4 shows an X-ray diffraction of blends of 10 wt. % 2C18M in three different BIMSMs: 1) Mw 400,000, PMS 2.3 mol. %, BrPMS 0.75 mol. %; 2) Mw 70,000, PMS 2.3 mol. %, BrPMS 0.2 mol. %; and 3) Mw 70,000, PMS 2.3 mol. %, BrPMS 1.3 mol. %. The low Mw BIMSMs both formed nanocomposites with good silicates dispersion.

Montmorillonite-based nanocomposites with a series of BIMSMs were prepared by solution blending, casting and annealing as described above. The montmorillonite was 2C18M described above. The BIMSMs all contained 2.3 mol. % PMS that was not brominated, and had Mw of either 400,000 or 70,000. One high Mw BIMSM was used which had 0.75 mol. % BrPMS; two low Mw BIMSMs were used, one had 0.2 mol. % BrPMS and the other had 1.3 mol. % BrPMS. The x-ray diffraction results shown in FIG. 4 show that better silicate dispersion was obtained in the hybrids with the low molecular weight BIMSMs.

Example 4

Effects of Blending High Mw and Low Mw BIMSMs

Blends of the high Mw BIMSM with the two low Mw BIMSMs of Example 3 were studied. The hybrids were formed by dissolving the appropriate proportions of the BIMSMs in the solvent to obtain a 10 wt. % solution, and casting and annealing as described above. Results are presented in Table 1 where the equivalent x-ray scattering data are represented as two peak heights.

TABLE 1

X-Ray Diffraction Data for BIMSM Blends Containing 10 wt. % Dimethyl-Dioctadecyl Ammonium Modified Montmorillonite, 2C18M

| BIMSM#1, Phr (Mw 70 k, PMS 2.3 mol. %, BrPMS 1.3 mol. %) | BIMSM#2, phr (Mw 70 k, PMS 2.3 mol. %, BrPMS 0.2 mol. %) | BIMSM#3, Phr (Mw 400 k, PMS 2.3 mol. %, BrPMS 0.75 mol. %) | Intensity at 2θ = 3.5° | Intensity at 2θ = 2.5° | Presence of Diffraction Peak |
|---|---|---|---|---|---|
| 100 | | | 61 | 69 | Very Broad d001 |
| 80 | | 20 | 52 | 66 | Very Broad d001 |

TABLE 1-continued

X-Ray Diffraction Data for BIMSM Blends Containing 10 wt. %
Dimethyl-Dioctadecyl Ammonium Modified Montmorillonite, 2C18M

| BIMSM#1, Phr (Mw 70 k, PMS 2.3 mol. %, BrPMS 1.3 mol. %) | BIMSM#2, phr (Mw 70 k, PMS 2.3 mol. %, BrPMS 0.2 mol. %) | BIMSM#3, Phr (Mw 400 k, PMS 2.3 mol. %, BrPMS 0.75 mol. %) | Intensity at 2θ = 3.5° | Intensity at 2θ = 2.5° | Presence of Diffraction Peak |
|---|---|---|---|---|---|
| 60 | | 40 | 69 | 81 | Very Broad d001 |
| 30 | | 70 | 65 | 90 | Very Broad d001 |
| 10 | | 90 | 55 | 73 | Very Broad d001 |
| 5 | | 95 | 210 | 147 | Well-Defined d001 |
| | | 100 | 240 | 143 | Well-Defined d001 & d002 |
| | 100 | | 80 | 110 | Broad d001 |
| | 75 | 25 | 112 | 136 | Well-Defined d001 |
| | 50 | 50 | 124 | 167 | Well-Defined d001 |
| | 25 | 75 | 150 | 142 | Well-Defined d001 |
| | 10 | 90 | 210 | 150 | Well-Defined d001 |

The data in Table 1 indicate that a low molecular weight BIMSM is essential to achieving high levels of exfoliation in high molecular weight polymers. The data for the blends with the 1.3 mol. % BrPMS, low Mw BIMSM illustrate that good exfoliation is achieved when the blend contains as little as 10% of the low Mw BIMSM when relatively high BrPMS levels are involved. On the other hand, low levels of BrPMS in the low Mw BIMSM suppress this effect and require the addition of a higher amount of low Mw BIMSM.

Example 5

Oxygen Permeability

Another low molecular weight BIMSM prepared by a suspension polymerization method had Mn of about 70,000 and Mw/Mn of about 2.3. Oxygen permeability data of nanocomposites based on this polymer and its blends with a high molecular weight BIMSM were obtained. The amount of 2C12M used in the nanocomposites was 5, 10 or 12 wt. %. The method for preparing the samples was otherwise identical to the procedures just described above.

Permeability measurements were performed in a custom designed and built high-throughput permeability tester with a test stage for simultaneously testing 16 samples to provide both transient and steady state data. The sample stage was designed using a silicon wafer with 16 regularly spaced 0.5 cm diameter apertures laid out on a 4×4 grid. A fine stainless steel mesh was attached to an upper side of the silicon wafer to ensure that the sample did not sag and also to provide mechanical support for the sample.

Typical experiments were performed utilizing a 1 cm×5 cm test strip with a thickness ranging from 0.02 mm to 0.5 mm depending on the inherent permeability of the samples, and four simultaneous measurements for each sample were recorded. The entire permeability apparatus was maintained at a constant temperature of 40° C. for all measurements. Each of the apertures was associated with a dedicated oxygen sensor (Glowmac Inc.) and the measurements were recorded every 30 seconds per sample to provide kinetic data. Prior to measurement, the sensor panel and the bottom portion of the permeability cell was swept with Argon, degassed and maintained under vacuum. On the upper side of the permeability cell, a constant pressure of oxygen was maintained and this was allowed to vary from 10 to 50 psi. Typical permeability measurements were performed for <12 hours and sample thickness was adjusted to ensure steady state behavior in that time period. In each array of measurements, a controlled pure unfilled polymer was also examined to benchmark the data and provide consistency between measurements. The oxygen permeability (relative) reported in Table 2 is referenced to the polymer(s) without any nanolayer.

TABLE 2

Oxygen Permeability Data for BIMSM-Silicate Composites

| BIMSM#4, Phr (Mn 70 k, PMS 2.3 mol. %, BrPMS 1.3 mol. %) | BIMSM#5, Phr (Mw 450 k, PMS 2.3 mol. %, BrPMS 1.3 mol. %) | Organic Modifier Type | Layered Silicate, wt. % | Permeability (relative to 0% layered silicate = 1.0) |
|---|---|---|---|---|
| 100 | | 2C18M | 5 | 0.58 |
| 100 | | 2C18M | 10 | 0.48 |
| | 100 | 2C18M | 5 | 0.75 |
| | 100 | 2C18M | 10 | 0.57 |
| | 100 | 2C18M | 12 | 0.52 |
| | 100 | C18FH | 5 | 0.48 |
| | 100 | 2C18L | 5 | 0.78 |
| 10 | 90 | 2C18M | 10 | 0.51 |
| 25 | 75 | 2C18M | 10 | 0.46 |
| 50 | 50 | 2C18M | 10 | 0.47 |

The data in Table 2 illustrate that the choice of BIMSM type, BIMSM blend and silicate type and amount, can affect the oxygen permeability of nanocomposites based on BIMSM(s).

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

We claim:

1. An elastomeric nanocomposite, comprising:
   a blend of from 5 to 95 phr high molecular weight elastomer having a weight average molecular weight greater than 250000, and from 5 to 95 phr functionalized low molecular weight elastomer having a weight average molecular weight less than 150000; and
   intercalated clay particles dispersed in the blend.

2. The elastomeric nanocomposite of claim 1, wherein at least one of the high and low molecular weight elastomers comprises a $C_4$ to $C_7$ isoolefin based elastomer.

3. The elastomeric composition of claim 2 wherein the isoolefin based elastomer is halogenated.

4. The elastomeric composition of claim 2 wherein the isoolefin based polymer comprises a styrenic comonomer.

5. The elastomeric composition of claim 4 wherein the styrenic comonomer is selected from styrene, α-methylstyrene, alkylstyrene (ortho, meta, or para) wherein the alkyl is any $C_1$ to $C_5$ alkyl or branched chain alkyl, and combinations thereof.

6. The elastomeric composition of claim 4 wherein the styrenic comonomer comprises para-methylstyrene.

7. The elastomeric composition of claim 2 wherein the isoolefin based polymer comprises a multiolefin comonomer.

8. The elastomeric composition of claim 7 wherein the multiolefin comonomer comprises a $C_4$ to $C_{14}$ conjugated diene or β-pinene.

9. The elastomeric composition of claim 7 wherein the multiolefin comonomer comprises isoprene.

10. The elastomeric composition of claim 2 wherein the low molecular weight elastomer comprises a copolymer of from 80 to 99.5 mol. % $C_4$ to $C_7$ isoolefin and from 0.5 to 20 mol. % para-alkylstyrene.

11. The elastomeric composition of claim 10 wherein the high molecular weight elastomer comprises a copolymer of from 80 to 99.5 mol. % isobutylene and from 0.5 to 20 mol. % para-methylstyrene.

12. The elastomeric composition of claim 11 wherein the low molecular weight elastomer comprises at least 5 mol. % of the para-methylstyrene groups.

13. The elastomeric composition of claim 11 wherein from 1 to 60 mol. % of the para-methylstyrene groups in the high and low molecular weight elastomers are functionalized with a functional group selected from halides, ethers, amines, amides, esters, acids, and hydroxyls.

14. The elastomeric composition of claim 13 wherein the functionalized para-methylstyrene groups are halogenated.

15. The elastomeric composition of claim 14 wherein the low molecular weight elastomer comprises at least 1 mol. % halogenated para-methylstyrene.

16. The elastomeric composition of claim 1 wherein said clay particles comprise from 1 to 25 phr.

17. The elastomeric composition of claim 1 further comprising a secondary rubber.

18. An elastomeric composition, comprising:
   a blend of (i) a first elastomer comprising an isobutylene based elastomer having a weight average molecular weight greater than 250000, and (ii) from 5 to 95 phr of a second elastomer comprising brominated poly-isobutylene-co-para-methylstyrene comprising from 2 to 20 wt. % para-methylstyrene, from 0.1 to 2 mol. % bromo-para-methylstyrene and a weight average molecular weight less than 150000; and
   intercalated clay particles dispersed in the blend.

19. The nanocomposite of claim 18 wherein the first elastomer comprises an interpolymer of a $C_4$ to $C_7$ isoolefin and an alkylstyrene.

20. The nanocomposite of claim 18 wherein the first elastomer comprises functional groups selected from the group consisting of halides, ethers, amines, amides, esters, acids, and hydroxyls.

21. The nanocomposite of claim 20 wherein the first elastomer is brominated.

22. The nanocomposite of claim 18 wherein the first elastomer comprises poly(isobutylene-co-p-methylstyrene).

23. The nanocomposite of claim 18 wherein the first elastomer comprises poly(isobutylene-co-p-methylstyrene-co-p-bromomethylstyrene).

24. The nanocomposite of claim 18 wherein the clay comprises an inorganic clay.

25. The nanocomposite of claim 18 wherein the clay comprises an organoclay.

26. The nanocomposite of claim 18 wherein the clay comprises a silicate.

27. The nanocomposite of claim 18 wherein the clay comprises smectite clay.

28. The nanocomposite of claim 27 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.

29. The nanocomposite of claim 27 wherein the smectite clay comprises montmorillonite.

30. The nanocomposite of claim 27 wherein the smectite clay comprises hectorite.

31. The nanocomposite of claim 27 wherein the smectite clay comprises laponite.

32. The nanocomposite of claim 18 further comprising a secondary rubber component in the blend.

33. The nanocomposite of claim 18 further comprising a filler selected from the group consisting of calcium carbonate, mica, silica, silicates, talc, titanium dioxide, carbon black, and mixtures thereof, in the blend of the first and second elastomers.

34. The nanocomposite of claim 18 further comprising a dye, pigment, antioxidant, heat and light stabilizer, plasticizer, oil, or mixture thereof, in the blend of the first and second elastomers.

35. The nanocomposite of claim 18 further comprising a curative system, the curative system comprising at least one component selected from the group consisting of an organic peroxide, zinc oxide, zinc stearate, stearic acid, an accelerator, a vulcanizing agent, or mixture thereof.

36. The nanocomposite of claim 18 further comprising a curative dispersed in the blend.

37. The nanocomposite of claim 18 wherein the blend is cured.

38. The nanocomposite of claim 18 wherein the first elastomer comprises poly(isobutylene-co-p-methylstyrene-co-p-bromomethylstyrene) and the second elastomer comprises at least 5 wt. % para-methylstyrene, at least 0.2 mol. % p-bromomethylstyrene and a weight average molecular weight from 25000 to 125000.

39. The nanocomposite of claim 38 wherein the second elastomer comprises at least 1 mol. % p-bromomethylstyrene.

40. A method of preparing an elastomeric nanocomposite of a high molecular weight elastomer having a weight average molecular weight above 250000, comprising:
    blending the high molecular weight elastomer with clay particles and an effective amount of a functionalized low molecular weight elastomer having a weight average molecular weight less than 150000 to disperse; and intercalate the clay particles.

41. The method of claim 40 wherein the blend comprises from 5 to 95 phr of the high molecular weight elastomer and from 5 to 95 phr of the functionalized low molecular weight elastomer.

42. The method of claim 40 wherein at least one of the high and low molecular weight elastomers comprises a $C_4$ to $C_7$ isoolefin based elastomer.

43. The method of claim 42 wherein the isoolefin based elastomer is halogenated.

44. The method of claim 42 wherein the isoolefin based polymer comprises a styrenic comonomer.

45. The method of claim 44 wherein the styrenic comonomer is selected from styrene, α-methylstyrene, alkylstyrene (ortho, meta, or para) wherein the alkyl is any $C_1$ to $C_5$ alkyl or branched chain alkyl, and combinations thereof.

46. The method of claim 44 wherein the styrenic comonomer comprises para-methylstyrene.

47. The method of claim 42 wherein the isoolefin based polymer comprises a multiolefin comonomer.

48. The method of claim 47 wherein the multiolefin comonomer comprises a $C_4$ to $C_{14}$ conjugated diene or β-pinene.

49. The method of claim 47 wherein the multiolefin comonomer comprises isoprene.

50. The method of claim 40 wherein the low molecular weight elastomer comprises a copolymer of from 80 to 99.5 mol. % $C_4$ to $C_7$ isoolefin and from 0.5 to 20 mol. % para-alkylstyrene.

51. The method of claim 50 wherein the high molecular weight elastomer comprises a copolymer of from 80 to 99.5 mol. % isobutylene and from 0.5 to 20 mol. % para-methylstyrene.

52. The method of claim 51 wherein the low molecular weight elastomer comprises at least 5 mol. % of the para-methylstyrene groups.

53. The method of claim 51 wherein from 1 to 60 mol. % of the para-methylstyrene groups in the high and low molecular weight elastomers are functionalized with a functional group selected from halides, ethers, amines, amides, esters, acids, and hydroxyls.

54. The method of claim 53 wherein the functionalized para-methylstyrene groups are halogenated.

55. The method of claim 54 wherein the low molecular weight elastomer comprises at least 1 mol. % halogenated para-methylstyrene.

56. The method of claim 41 wherein said clay particles comprise from 5 to 25 phr.

57. The method of claim 41 further comprising a secondary rubber.

58. A method of preparing an elastomeric nanocomposite of a high molecular weight elastomer having a weight average molecular weight above 250000, comprising:
    blending clay particles with a first elastomer comprising an isobutylene based elastomer having a weight average molecular weight greater than 250000, and an effective amount of a second elastomer comprising brominated poly-isobutylene-co-para-methylstyrene comprising from 2 to 20 wt. % para-methylstyrene, from 0.1 to 2 mol. % para-bromomethylstyrene and a weight average molecular weight less than 150000, to disperse; and intercalate the clay particles.

59. The method of claim 58 wherein the first elastomer comprises an interpolymer of a $C_4$ to $C_7$ isoolefin and an alkylstyrene.

60. The method of claim 58 wherein the first elastomer comprises functional groups selected from the group consisting of halides, ethers, amines, amides, esters, acids, and hydroxyls.

61. The method of claim 60 wherein the first elastomer is brominated.

62. The method of claim 58 wherein the first elastomer comprises poly(isobutylene-co-p-methylstyrene).

63. The method of claim 58 wherein the first elastomer comprises poly(isobutylene-co-p-methylstyrene-co-p-bromomethylstyrene).

64. The method of claim 58 wherein the clay comprises an inorganic clay.

65. The method of claim 58 wherein the clay comprises an organoclay.

66. The method of claim 58 wherein the clay comprises a silicate.

67. The method of claim 58 wherein the clay comprises smectite clay.

68. The method of claim 67 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.

69. The method of claim 67 wherein the smectite clay comprises montmorillonite.

70. The method of claim 67 wherein the smectite clay comprises hectorite.

71. The method of claim 67 wherein the smectite clay comprises laponite.

72. The method of claim 68 further comprising blending a secondary rubber component with the first and second elastomers.

73. The method of claim 58 further comprising blending a filler selected from the group consisting of calcium carbonate, mica, silica, silicates, talc, titanium dioxide, carbon black, and mixtures thereof, with the first and second elastomers.

74. The method of claim 58 further comprising blending a dye, pigment, antioxidant, heat and light stabilizer, plasticizer, oil, or mixture thereof, with the first and second elastomers.

75. The method of claim 58 further comprising blending a curative system comprising at least one component selected from the group consisting of an organic peroxide, zinc oxide, zinc stearate, stearic acid, an accelerator, a vulcanizing agent, or mixture thereof, with the first and second elastomers.

76. The method of claim 58 further comprising blending a curative with the first and second elastomers.

77. The method of claim 58 further comprising curing the resulting blend.

78. The method of claim 58 wherein the first elastomer comprises poly(isobutylene-co-p-methylstyrene-co-p-bromomethylstyrene) and the second elastomer comprises at least 5 wt. % para-methylstyrene, at lest 0.2 mol. % p-bromomethylstyrene and a weight average molecular weight from 25000 to 125000.

79. The method of claim 78 wherein the second elastomer comprises at least 1 mol. % p-bromomethylstyrene.

80. The nanocomposite formed by the method of claim 40.

81. The nanocomposite formed by the method of claim 58.

82. An inner tube or tire innerliner comprising the nanocomposite of claim 80.

83. An inner tube or tire innerliner comprising the nanocomposite of claim 81.

* * * * *

UNITED STATES PATENT AND TRADEMARK OFFICE
CERTIFICATE OF CORRECTION

PATENT NO. : 7,638,573 B2  Page 1 of 1
APPLICATION NO. : 11/400662
DATED : December 29, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this

Ninth Day of November, 2010

David J. Kappos
*Director of the United States Patent and Trademark Office*